July 5, 1938. M. VOGEL-JORGENSEN 2,123,028
METHOD OF PRODUCING COLORED ASBESTOS CEMENT PRODUCTS
Filed June 16, 1936
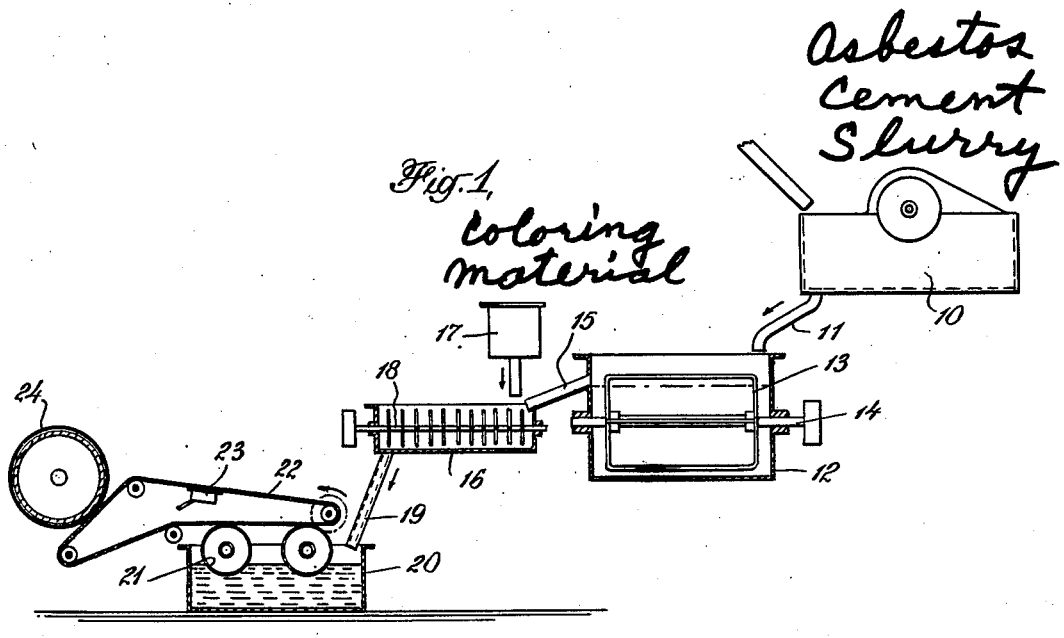
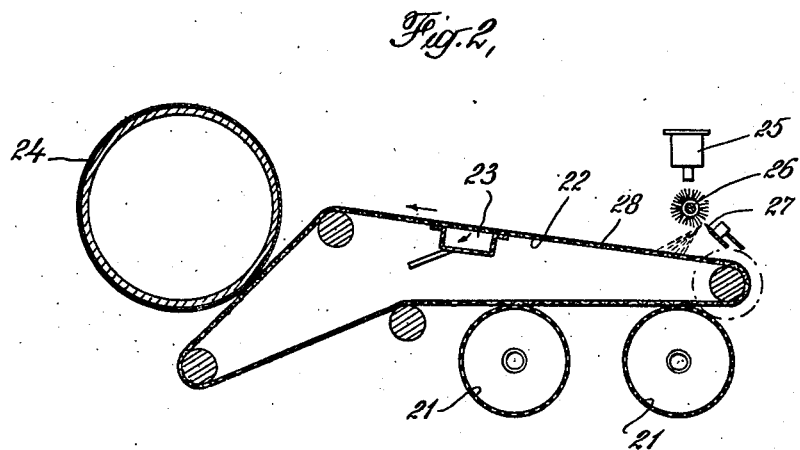

Patented July 5, 1938

2,123,028

UNITED STATES PATENT OFFICE 2,123,028

METHOD OF PRODUCING COLORED ASBESTOS-CEMENT PRODUCTS

Mikael Vogel-Jorgensen, Frederiksberg, near Copenhagen, Denmark, assignor to F. L. Smidth & Company, New York, N. Y., a corporation of New Jersey Application June 16, 1936, Serial No. 85,511
In Denmark July 25, 1935

6 Claims. (Cl. 92—21)

This invention relates to the production of asbestos cement products, and is concerned more particularly with a novel method and apparatus for incorporating coloring material in such products during their formation.

In the manufacture of asbestos cement products by the use of a paper machine of the millboard type, asbestos cement slurry which has been subjected to a mixing operation in a hollander is picked up in a layer on a travelling band where it is subjected to suction to remove water, and the layer is then transferred to a drum usually referred to as a forming bowl. As the forming bowl rotates, the layer of material is wound thereon until the wound mass has a desired thickness, after which the operation is stopped, and the material is removed from the drum and subjected to the final manufacturing operations.

In the production of colored products in accordance to the method described, it has been the practice heretofore either to introduce the coloring matter into the hollander where it is mixed with the slurry and permeates the entire mass, or to apply the coloring material to the surface of the asbestos cement layer either after it has left the paper machine or at as late a stage as possible in the production of the layer on the machine. In some cases, the prior methods have been combined, but however used, those methods are not wholly satisfactory. When the coloring matter is introduced into the hollander, the final product is dull in color because the coloring matter ordinarily employed is adversely affected by the calcium hydroxide liberated by the cement, and also by the long mechanical treatment, lasting from 1½ to 2 hours, to which the slurry is subjected in the hollander. When the coloring matter is applied to the layer during its formation on the paper machine or thereafter, the coloring is limited to the surface of the final product and that product may easily be discolored, either by damage which exposes the uncolored body, or by the erosion of the coloring matter which occurs in the course of time when the product is exposed to the weather. A combination of the two methods gives somewhat better results, but is objectionable in that when the surface coloring has been removed, the body of the product is dull in color.

The present invention is, accordingly, directed to the provision of a simple method and apparatus for the production of asbestos cement products which have a permanently attractive color. In these products, the coloring matter is distributed throughout the entire asbestos cement mass, instead of being confined to the surface, and the color is thus resistant to wear and weather. At the same time, the coloring matter is so introduced into the mass that it is not detrimentally affected by chemical or mechanical action and because of that, the cost of production is reduced, since a less amount of coloring matter is required, and the amount employed may thus be reduced.

According to the invention, the coloring matter is introduced into and distributed through the previously prepared asbestos cement slurry, that is, the slurry as it leaves the hollander and before it has reached the paper machine, and the mixing of the coloring matter with the slurry may take place in a stirring vessel or vat through which the slurry flows at a constant rate. This distribution of the coloring matter through the slurry requires only a short period of time, and since the coloring matter is subjected only briefly to mechanical treatment in contact with the slurry, and as the slurry is immediately thereafter formed into products, the deterioration of the coloring matter is much less than that occurring in prior methods. Also, despite the relatively short duration of the mixing operation, the coloring material is more uniformly distributed through the slurry, because in the mixing, smaller quantities of slurry and coloring matter are undergoing a continuous mixing action. As less deterioration of the coloring matter occurs, the amount thereof that is required can be reduced and the cost of operation is thereby lowered.

In most instances, it is desirable to add further quantities of coloring matter to the surface of one or more of the layers of asbestos cement which constitute the wound mass on the forming bowl, and such additional coloring matter is preferably applied to the surface of the layer on the traveling band before that layer is subjected to suction. When the coloring matter is thus applied, the suction tends to draw it more deeply into the layer so that it is well bound to the asbestos cement in the finished product, and is not easily worn off or otherwise displaced. The application of the coloring matter in this manner may be carried on continuously, so that each layer of material which forms a single final mass may have a surface coloring in addition to the coloring matter distributed through it, or the surface coloring may be applied intermittently so that one or more layers which are to be combined into a single mass may have the surface coloring.

For a better understanding of the invention, reference may be had to the accompanying drawing in which, Fig. 1 is a view in side elevation partly in section showing apparatus appropriate for carrying out the new method, and Fig. 2 is a sectional view on an enlarged scale showing a portion of the apparatus illustrated in Fig. 1.

Referring to the drawing, the apparatus illustrated includes a hollander 10 of the usual construction in which an asbestos cement slurry is produced by a mixing operation in the usual ordinary way. From the hollander, the slurry is discharged by a conduit 11 into a relatively large vat 12 in which the slurry is stirred by a rotating stirring device 13 mounted on a driven shaft 14. The substantially homogeneous slurry thus made by the mixing and stirring operations carried on in the hollander and vat, respectively, is discharged from the vat at a constant rate through the conduit 15 into a small mixing apparatus 16 into which the coloring matter is introduced from a container 17. The supply of coloring matter is regulated in accordance with the flow of slurry through the apparatus, and the coloring matter is uniformly distributed through the slurry by a rotating stirring device 18 within the apparatus.

The mixed slurry and coloring matter leave the mixing apparatus and flow through a pipe 19 to a vat 20 in which rotate so-called sifting cylinders 21. These cylinders serve to pick up slurry from the vat and deliver it to a travelling belt or band 22 of filter cloth. As the band advances with the layer of material thereon, it passes over a vacuum box 23 by which the water is removed from the layer, and the layer is then removed from the band and wound upon a forming bowl 24. When a mass of asbestos cement material of the desired thickness has thus been wound on the forming bowl, the material is removed and subjected to the final manufacturing operations.

In the practice of the new method on the apparatus described, the coloring matter is introduced into previously prepared slurry instead of being mixed with the asbestos cement and subjected therewith to the mechanical treatment by which the slurry is formed. The coloring matter is, therefore, not subjected to the detrimental effects of the long mechanical treatment and of the chemical action of constituents of the cement. The coloring matter is thoroughly distributed through the slurry because it is continuously supplied and mixed with small quantities of the slurry and the final product thus contains coloring matter which is uniformly distributed therethrough and is of attractive color, because it has not been dulled by chemical and mechanical actions.

In some instances, it may be desirable to employ additional coloring material by applying it to the surface of the layer which is to be wound on the forming bowl, and for this purpose, the modified form of apparatus shown in Figure 2 may be used. This apparatus includes the sifting cylinders 21 from which the layer is picked up by the traveling band 22 and passed over the vacuum box 23 on its way to the forming bowl 24. In advance of the vacuum box is a container 25 by which coloring material is distributed on a rotating brush 26. The bristles of this brush contact with a blade 27 as the brush rotates, with the result that the coloring matter delivered to the brush is discharged on the surface of the layer 28 on the band 22. The means illustrated in Figure 2 for applying additional coloring material to the surface of the layer may operate continuously so that each convolution of the layer wound on the forming bowl has a colored film on its surface or the apparatus may operate intermittently, so that only a portion of the layer is thus colored.

It will be seen that by the use of the new method and apparatus, the advantages of employing coloring matter uniformly distributed throughout the body of the asbestos cement material are obtained, and at the same time, the color is not dulled. Because of this, a less amount of coloring material may be employed, and the cost of manufacture is thereby reduced.

The term "immediately" is used in the appended claims to indicate that the colored asbestos-cement slurry is formed into the desired products shortly after the incorporation of the color and before constituents of the slurry have had a material dulling or discoloring effect upon the added coloring matter. It does not necessarily mean that the slurry passes directly to the apparatus used for forming the products, as it may pass first to a vat or the like, as shown in the drawing.

I claim:

1. A method of producing colored asbestos-cement products which comprises preparing an asbestos-cement slurry by a mixing operation, thereafter incorporating coloring matter into and distributing it through the previously prepared slurry, forming the slurry into products immediately after the incorporation and distribution of the coloring matter therein and before material dulling or discoloring of the coloring matter, and removing water from said products.

2. A method of producing colored asbestos-cement products which comprises preparing an asbestos-cement slurry by a prolonged mixing operation, thereafter incorporating coloring matter into and distributing it through the previously prepared slurry by a rapid mixing operation, forming a layer of the slurry immediately after the incorporation and distribution of the coloring matter therein and before material dulling or discoloring of the coloring matter, and removing water from said layer.

3. A method of producing colored asbestos-cement products which comprises preparing an asbestos-cement slurry by a prolonged mixing operation, thereafter incorporating coloring matter into and distributing it through the previously prepared slurry by a rapid mixing operation, forming a layer of the slurry immediately after the incorporation and distribution of the coloring matter therein and before material dulling or discoloring of the coloring matter, applying additional coloring matter to a surface of the layer, and removing water from the layer.

4. A method of producing colored asbestos-cement products which comprises preparing a substantial homogeneous asbestos-cement slurry by a mixing operation, creating a stream of the prepared slurry, substantially continuously introducing coloring matter into and distributing it throughout the slurry in said stream, forming the slurry into products immediately after incorporation and distribution of the coloring matter therein and before material dulling or discoloring of the coloring matter, and removing water from said products.

5. A method of producing colored asbestos-cement products which comprises preparing an asbestos-cement slurry by a prolonged mixing operation, creating a stream of the prepared slurry, substantially continuously introducing coloring matter into and distributing it throughout the slurry in said stream by a rapid mixing operation, forming the slurry into a layer immediately after the incorporation and distribution of the coloring matter therein and before material dulling or discoloring of the coloring matter, applying additional coloring matter to one surface of said layer, and thereafter removing water from the layer through the opposite surface thereof by vacuum action.

6. A method of producing colored asbestos-cement products which comprises preparing a homogeneous asbestos-cement slurry by a prolonged mixing operation, thereafter incorporating coloring matter into and distributing it through the previously prepared slurry, forming the slurry into a layer immediately after the incorporation and distribution of the coloring matter therein and before material dulling or discoloring of the coloring matter, applying additional coloring matter to a surface of said layer by means of a rotary brush, and thereafter removing water from the layer through the opposite surface thereof by vacuum action.

MIKAEL VOGEL-JORGENSEN.